(12) United States Patent
Dargent et al.

(10) Patent No.: US 6,443,398 B2
(45) Date of Patent: Sep. 3, 2002

(54) REDUNDANT ENERGY STORAGE DEVICE HAVING MOMENTUM WHEELS

(75) Inventors: Thierry Dargent, Auribeau sur Siagne; Myriam Tur, Mandelieu la Napoule, both of (FR)

(73) Assignee: Alcatel, Paris (FR)

( * ) Notice: Subject to any disclaimer, the term of this patent is extended or adjusted under 35 U.S.C. 154(b) by 9 days.

(21) Appl. No.: 09/753,610

(22) Filed: Jan. 4, 2001

(30) Foreign Application Priority Data

Jan. 10, 2000 (FR) .......................................... 00 00218

(51) Int. Cl.$^7$ ................................................ B64G 1/28
(52) U.S. Cl. ...................................................... 244/165
(58) Field of Search ................................ 244/164, 165, 244/158 R

(56) References Cited

U.S. PATENT DOCUMENTS

| | | | | |
|---|---|---|---|---|
| 3,424,401 | A | * 1/1969 | Maurer | 244/165 |
| 3,526,795 | A | * 9/1970 | Pecs | 244/165 |
| 4,179,818 | A | * 12/1979 | Craig | 244/165 |
| 5,826,829 | A | * 10/1998 | Holmes | 244/165 |
| 6,076,772 | A | * 6/2000 | Eyerly et al. | 244/165 |
| 6,089,508 | A | * 7/2000 | Noyola et al. | 244/165 |
| 6,289,263 | B1 | * 9/2001 | Mukherjee | 901/23 |

FOREIGN PATENT DOCUMENTS

| | | |
|---|---|---|
| DE | 39 41 654 A1 | 6/1991 |
| EP | 0 922 636 A1 | 6/1999 |

OTHER PUBLICATIONS

Ayer Francois et al.: "New Opportunities for Satellite Integrated Power and Attitude Control Systems" Proceedings fo the Annual meeting. Navigational Technology fo the 3$^{rd}$ Millenium, Jun. 19, 1997, pp. 831–841, XP002096034.

Flatley Thomas W: "Tetrahedron Array of Reaction Wheels for Attitude Control and Energy Storage" Proceedings of the 20$^{th}$ Intersociety Energy Conversion Engineering Conference, col. 2, pp. 438–443, XP000955178 Warrendale, PA, USA.

Pieronek Thomas J et al.: "Spacecraft Flywheel Systems– – Benefits and Issues" Proceedings of the IEEE National Aerospace and Electronics Conference. NAECON, US, New York, IEEE, vol. CONF. 49, Jul. 14, 1999, pp. 589–593, XP002096033 ISBN: 0–7803–3726–3.

* cited by examiner

*Primary Examiner*—Galen L. Barefoot
(74) *Attorney, Agent, or Firm*—Sughrue Mion, PLLC

(57) ABSTRACT

The invention provides a momentum wheel energy storage device for a spacecraft or satellite. The device has six wheels whose axes of rotation are parallel to edges of a tetrahedron. It thus provides redundancy which makes it possible simultaneously to store energy and to generate an arbitrary net angular momentum, even in the event of one of the wheels failing. The failure of one wheel can be accommodated without degrading operation, with energy storage being optimal regardless of the angular momentum to be generated. The failure of two wheels can be accommodated but operation may then be in degraded mode. The invention makes it possible to limit the number of momentum wheels used in a device that can accommodate failures.

14 Claims, 1 Drawing Sheet

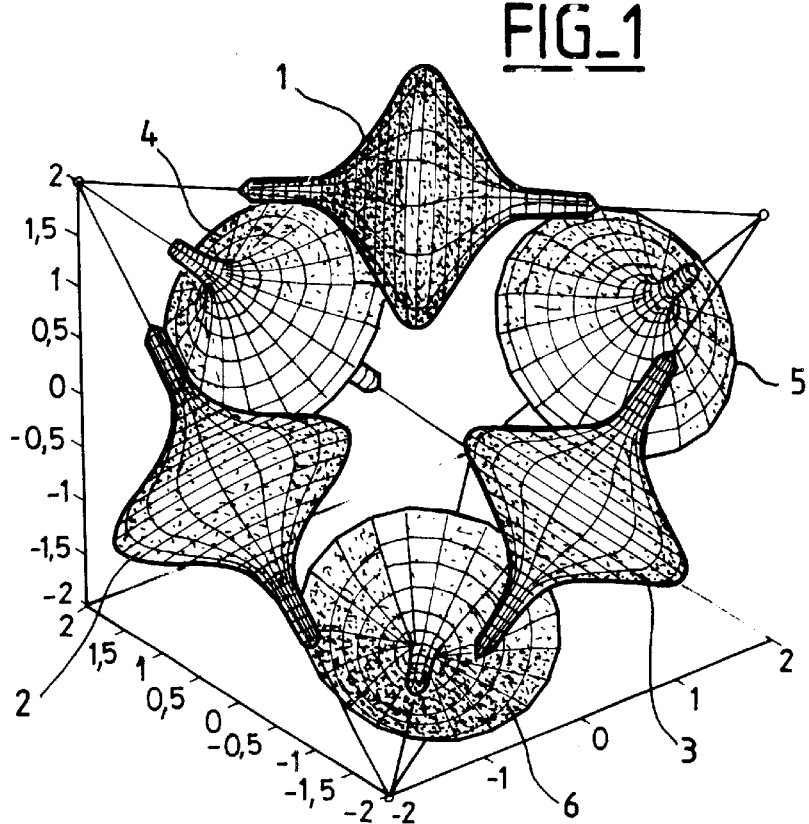
FIG_1
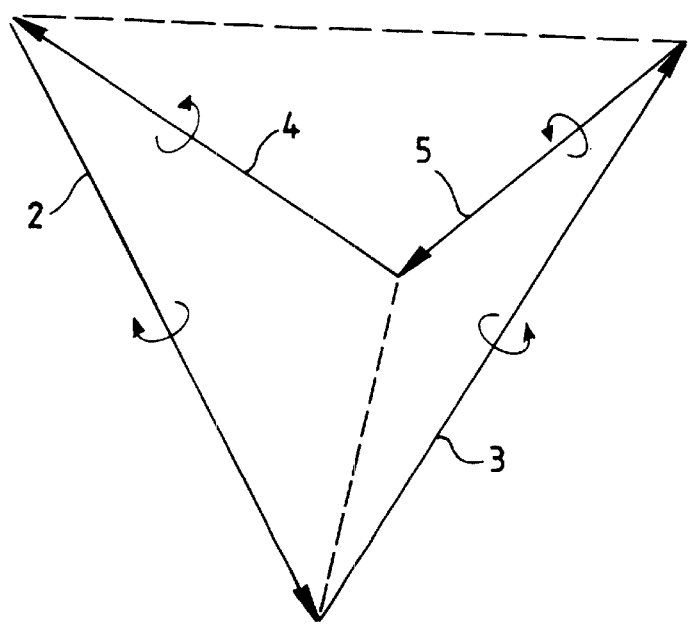
FIG_2

REDUNDANT ENERGY STORAGE DEVICE HAVING MOMENTUM WHEELS

The invention relates to spacecraft, in particular satellites. More particularly, the invention relates to storing energy and controlling attitude by means of momentum wheels in satellites.

BACKGROUND OF THE INVENTION

Satellites are commonly provided with solar panels which serve to provide electrical power for the equipment on board the satellite. Because the sun is eclipsed, energy storage devices are also provided so as to continue providing electricity when the satellite is in a position from which the sun is not visible. Proposals have been made to use batteries for this purpose, or energy storage devices that rely on momentum wheels. Momentum wheels store energy in the form of kinetic energy of rotation. The advantage of devices using momentum wheels, apart from their specific energy storage characteristics, is that they can also be used to alter the attitude of the satellite by acting on the speeds of rotation of the wheels variations in the speeds of rotation of the wheels give rise to variations in angular momentum that generate torque and thus enable the attitude of the satellite to be varied.

EP-A-0 922 636 proposes such an energy storage device based on momentum wheels; the introduction of that document sets out the advantages of momentum wheels compared with batteries, and the general principle on which momentum wheels operate. In that document, a device is proposed that uses pairs of wheels rotating in opposite directions; thus, when both wheels in a pair are in alignment and rotating at the same speed, the net angular momentum is zero. The mechanism has three pairs of wheels aligned on three axes in an orthogonal frame of reference, plus a fourth pair of wheels positioned so as to be capable of replacing any one of the other pairs in the event of failure. That document therefore proposes a mechanism having eight momentum wheels.

EP-A-0 849 170 describes another device for storing energy by momentum wheels. In that document, it is proposed to use one pair of momentum wheels with aligned axes, or three pairs of wheels on three orthogonal directions, or indeed a pyramid configuration.

U.S. Pat. No. 5,611,505 describes another energy storage device using momentum wheels. In that document, proposals are made to use a pair of momentum wheels; each of the wheels is mounted on a gimbal suspension with degrees of freedom about two axes perpendicular to the axis of rotation of the wheel.

In a presentation to NTIS, Flywheel Energy Storage Workshop, Oak Ridge, December 1995, TRW describes various configurations of momentum wheels, enabling four degrees of freedom to be obtained in an energy storage system using momentum wheels; the four degrees of freedom correspond to three components of the momentum, which is a vector, and to the energy stored which is a scalar. A first configuration uses two wheels mounted on gimbals, the axis of rotation of each wheel being movable with a single degree of freedom. A second configuration uses two wheels in alignment and mounted head to head, on a suspension allowing the axis of rotation of the wheels to move with two degrees of freedom. A third configuration uses four wheels disposed on four lines converging on the apex of a pyramid.

In a presentation to the 17th Annual Space Power Workshop, Long Beach, Calif., Apr. 19–22, 1999, The Charles Stark Draper Laboratory Inc. proposed various configurations of momentum wheels. For a pair of contrarotating wheels, a first configuration is to provide a suspension having two degrees of freedom for each wheel, with suspension axes perpendicular to the axis of rotation of each wheel. Still for two wheels, a second configuration consists in providing a suspension having one degree of freedom about an axis perpendicular to the axis of rotation for each of the wheels, and a suspension having one degree of freedom about the axis of rotation for the pair of wheels. A third configuration uses three pairs of contrarotating wheels on three fixed orthogonal axes. In a fourth configuration, four wheels are disposed with axes of rotation that are perpendicular to the faces of a tetrahedron. A fifth configuration uses three wheels mounted on suspensions having one degree of freedom. The three axes of rotation intersect and are coplanar at rest, and the suspensions enable two of the wheels to move their axes in the coplanar plane and the third wheel to move perpendicularly to the plane.

OBJECTS AND SUMMARY OF THE INVENTION

The problem of the invention is to propose an energy storage system using momentum wheels which presents a minimum number of wheels, which provides four degrees of freedom, and which can accommodate failure of at least one wheel while continuing to operate in satisfactory manner.

In addition, the invention solves the novel problem of device symmetry regardless of which wheel should fail. Prior art systems are often symmetrical; however, symmetry is lost in the event of a wheel failing, and after failure some configurations are unfavorable for storing energy; the energy stored in a wheel can require a speed of about 100,000 revolutions per minute (rpm), and that generates significant angular momentum; this momentum is compensated only by rotation in the opposite direction of another wheel. The failure of one wheel in a pair limits the speed at which the remaining wheel of the pair can rotate, and thus the amount of energy that can be stored.

Unlike that, in the invention, in the event of a failure, proper operation continues to be ensured; in particular, the quantity of energy that can be stored does not decrease in the event of a failure.

The invention thus makes it possible to store energy in a minimum volume with a minimum mass for a given quantity of energy. The energy also makes it possible to conserve satisfactory operation even in the event of the failure of one wheel, and possibly even of two wheels.

More precisely, the invention proposes a momentum wheel energy storage device having at least five wheels whose axes of rotation are substantially parallel to the edges of a tetrahedron.

Advantageously, the device has six wheels. The tetrahedron is preferably a regular tetrahedron.

In an embodiment, the axis of rotation of a wheel is at an angle of less than 30° relative to the corresponding edge of the tetrahedron, and preferably less than 5°.

It is also advantageous for the axes of the wheels to be fixed.

The invention also proposes a spacecraft, in particular a satellite, having such an energy storage device.

Finally, the invention provides a method of storing energy in such a device, the method comprising driving four wheels in rotation. These four wheels can, in particular, be substantially parallel to edges of the tetrahedron that are adjacent in pairs.

Preferably, the directions of rotation of the wheels are such that the angular momentum vectors all point in the same direction around a closed zigzag loop formed by the four edges.

BRIEF DESCRIPTION OF THE DRAWING

Other characteristics and advantages of the invention will appear on reading the following description of embodiments of the invention, given by way of example and with reference to the accompanying drawing, in which:

FIG. 1 is a diagrammatic representation of an energy storage system of the invention; and FIG. 2 is a diagrammatic representation of the rotation vectors of the wheels in one method of operating the device of the invention.

MORE DETAILED DESCRIPTION

To minimize the number of momentum wheels while ensuring symmetry for the device even in the event of failure, the invention proposes using five or six fixed-axis momentum wheels whose axes are disposed substantially parallel to the edges of a tetrahedron. In such a configuration, it is possible to use a normal mode of operation involving four of the six wheels, thus enabling four degrees of freedom to be provided as in prior art systems. In the event of a wheel failing, it is possible to conserve a four-wheel configuration that is symmetrical, thereby enabling proper operation to be continued. The invention functions even in the event of two failures, possibly under degraded conditions.

The figure is a diagrammatic representation of an embodiment of the invention. In this embodiment, the storage device has six wheels and the axes of the wheels form a regular tetrahedron. In other words, each of the wheels has an axis of rotation that is parallel to a respective one of the edges of a tetrahedron. The wheels are referenced 1 to 6 in the figure, and the references 1 to 6 are used below when describing the invention both for the wheels themselves and for their axes of rotation. The figure shows the wheels situated on the edges of a tetrahedron: to obtain the advantages of the invention, the exact positions of the wheels are not important, since the advantages stem from the directions of the various wheels. The exact positions occupied by the wheels will depend on available volume; the configuration shown in FIG. 1 is very economical in terms of volume and enables the volume occupied by the energy storage device to be minimized. It is also possible to place the wheels in other positions, and in particular distributed about a spacecraft, providing the constraints of the invention concerning their axes of rotation are complied with.

In the embodiment shown in the figure, the axes of the wheels are exactly parallel with the edges of the tetrahedron and indeed they coincide with those edges. The invention also applies even if the axes of rotation of the wheels are merely substantially parallel to the edges of a tetrahedron. For example provision can be made for the angle between the axis of a wheel and the corresponding edge of a tetrahedron to be less than or equal to 30°, or better to be less than or equal to 5°.

In the embodiment shown in the figure, the tetrahedron is a regular tetrahedron. This is the optimum configuration when there is no privileged direction for the angular momentum generated by the rotation of the wheels in the device. However the invention also applies to a tetrahedron that is not regular. Such a configuration can be advantageous when there exists a privileged direction for the angular momentum generated by the rotation of the wheels of the device. It is preferable to avoid a degenerative tetrahedron, i.e. contained in a plane, since that would not enable control to be provided over all three components of angular momentum.

The wheels of the FIG. 1 device are wheels that are "fixed" in the sense that their axes are not provided with gimbal type means enabling them to move. This simplifies the storage device and keeps its cost down. The device is mechanically more robust and simpler to install, since it does not require any provision to allow the axes of rotation to move.

It is also advantageous for the wheels to be identical. As explained below when describing the operation of the device, there is no privileged direction, and device symmetry is conserved if all of the wheels are identical.

To implement the invention, it is possible to use any type of conventional momentum wheel; the invention has no bearing on the conventional operation of each wheel considered independently of the others; the operation of such a wheel is therefore not described in greater detail.

The device of the invention operates as follows. In normal operation, only four of the six wheels are used. The remaining two wheels are spares for use in the event of a failure. From this point of view it is best for the edges of the tetrahedron which correspond to the four wheels in rotation to be adjacent in pairs, being either contiguous or intersecting. By way of example, with the notation of FIG. 1, it is possible in normal operation to use the wheels $\{1, 3, 4, 6\}$, $\{1, 2, 5, 6\}$, or $\{2, 3, 4, 5\}$. In other words, the edges of the tetrahedron corresponding to the two unused wheels of the device are preferably edges that are not coplanar. This configuration makes it easy to generate net angular momentum that is substantially zero, independent of the speeds of rotation of the wheels.

This can be seen by considering the angular momentum generated by each wheel. In conventional manner, the angular momentum $\vec{H}$ generated by a wheel is a vector whose direction is the direction of the axis of rotation of the wheel, assuming that the wheel is balanced exactly. The direction of the vector is given by the direction of rotation using the forward direction definition rule of an orthogonal frame of reference. The modulus of the vector is given by the relationship $|\vec{H}|=\sqrt{2.J.E}$ where J is the moment of inertia of the wheel and E is the energy stored in the wheel. FIG. 2 is a diagram of the rotary vectors of the wheels in one method of operating the device of the invention. This example relates to wheels 2, 3, 4, and 5 being in rotation. The directions of rotation of the wheels are shown in the figure, and the directions of the corresponding momentum vectors are also shown. When the speeds of rotations are equal and the wheels are identical, it is clear that the vector sum of the angular momentums in the FIG. 2 configuration is zero. By choosing to rotate the wheels in these directions of rotation it is possible to obtain a net angular momentum that is practically zero, and this applies regardless of the particular speed of rotation of the wheels providing it is equal or substantially equal.

This can be expressed as follows:

the axes of the wheels are the edges of a tetrahedron that are adjacent in pairs, or that form a closed zigzag loop in three dimensions; and the directions of rotations of the wheels are such that the angular momentum vectors all point in the same direction when going round the zigzag loop.

These constraints serve to optimize energy storage in the device while generating arbitrary angular momentum and using four wheels for storing energy. Arbitrary net angular momentum can be obtained by varying the speeds of rotation of the wheels. In this configuration it depends only on the relative speeds of the wheels. It is thus possible to select all three components of angular momentum and the amount of energy stored independently from one another.

In the event of a failure, the device of the invention operates as follows. If one out of the six wheels of the storage device fails, then it is always possible to use four wheels that are disposed in the above-described optimum configuration. Thus, if wheel 1 or wheel 6 is faulty, then wheels 2, 3, 4, and 5 are used in normal operation.

The device can also accommodate a second failure. It is possible that the two faulty wheels are wheels whose axes of rotation are parallel to edges of the tetrahedron that are not coplanar and that do not intersect. Under such circumstances, the four remaining wheels are in the optimum configuration described with reference to FIG. 2. For example if both the wheels 1 and 6 should fail, then under such circumstances wheels 2, 3, 4, and 5 would continue to be used. However, it is also possible that the two faulty wheels have axes that are parallel to coplanar edges of the tetrahedron. Under such circumstances, four usable wheels remain in the storage device. Three of them have axes parallel to coplanar edges of the tetrahedron while the axis of the fourth wheel intersects the plane formed by those three other edges. Under such circumstances, the fourth wheel can be used to generate any necessary resultant angular momentum in a direction perpendicular to said plane; the component in the plane in question is generated by all four wheels; to this end, the relative speeds of the other three wheels are adjusted. Under such circumstances, the speed of rotation of the fourth wheel is determined by the resulting angular momentum. The speeds of rotation of the other three wheels can be large so energy is stored mainly in those other three wheels. Thus, in this degraded configuration, the ability of the device to store energy is limited compared with the configuration of FIG. 2.

Compared with prior art devices, the invention provides operation that is more efficient in the event of failure and it does so with a smaller number of wheels. The only prior art system that provides redundancy with "fixed" wheels is the eight-wheel device described in EP-A-0 922 636 having three pairs of wheels disposed on three orthogonal axes and a fourth pair of wheels disposed so as to be capable of replacing any one of the other three pairs in the event of a failure. In that prior art device, the failure of one out of the three pairs of wheels requires the corresponding pair of wheels to be stopped and the fourth pair of wheels is used instead. Storage capacity is not affected. A second failure leads to operation in degraded mode with a limit on the capacity to store energy. Functionally speaking, the invention provides the same results, while using only six wheels instead of eight. To a first approximation, the cost of the system of the invention is 25% less than that of an eight-wheel system.

Naturally, the present invention is not limited to the embodiments described and shown, and it can be varied in numerous ways by the person skilled in the art. As mentioned above, the position of the wheels in the satellite or in the spacecraft can be various.

It is also possible to provide a five-wheel configuration. This configuration is less advantageous than a six-wheel configuration. As explained above, in the event of a failure, it is possible to obtain a configuration of the type shown in FIG. 2, but it is also possible to obtain a degraded configuration. It nevertheless remains possible to use such a configuration having only five wheels.

It is also possible to use not only four wheels in normal operation but five or six wheels. This can be advantageous, for example, in the event of a need to store a large quantity of energy.

It is also possible to provide more than six wheels, in which case some of the wheels are parallel. This configuration provides additional redundancy, particularly in the event of "hot" redundancy. For example, a device having six pairs of wheels placed in parallel with the edges of a tetrahedron can accommodate the failure of at least three wheels. Under such circumstances, it is possible to provide operation with wheels on four edges of the tetrahedron. It is also possible to use a ten-wheel device with pairs of wheels on the four edges that are normally used, and with a single wheel on the other two edges. This configuration reduces the number of wheels and is advantageous if the probability of wheel failure is an increasing function of time.

In the embodiments of the invention described the wheel axes are fixed. Naturally, provision could be made for the axes of rotation to move to a small extent, e.g. to correct for faults in the wheels.

What is claimed is:

1. A momentum wheel energy storage device having at least five wheels whose axes of rotation are substantially parallel to edges of a tetrahedron.

2. The device of claim 1, having six wheels.

3. The device of claim 1, wherein the tetrahedron is a regular tetrahedron.

4. The device of claim 1, wherein the axis of rotation of a wheel forms an angle of less than 30° relative to the corresponding edge of the tetrahedron.

5. The device of claim 1, wherein the axis of rotation of a wheel forms an angle of less than 5° relative to the corresponding edge of the tetrahedron.

6. The device of claim 1, wherein the wheels are fixed-axis wheels.

7. A spacecraft, in particular a satellite, having an energy storage device according to claim 1.

8. The device of claim 1, wherein said at least five wheels are substantially identical.

9. The device of claim 1, comprising a means for limiting the number of wheels used in the device.

10. The device of claim 1, wherein the tetrahedron is not a regular tetrahedron.

11. A method of storing energy in a device according to claim 2, the method comprising rotating four of the wheels.

12. A method of storing energy in a momentum wheel energy storage device comprising at least five wheels whose axes of rotation are substantially parallel to edges of a tetrahedron, the method comprising:

rotating four of the wheels.

13. The method of claim 12, wherein the four wheels are substantially parallel to edges of the tetrahedron that are adjacent in pairs.

14. The method of claim 13, wherein the directions of rotation of the wheels are such that the angular momentum vectors all point in the same direction around a zigzag loop formed by the four edges.

* * * * *